United States Patent
Peters

(10) Patent No.: US 11,199,146 B2
(45) Date of Patent: Dec. 14, 2021

(54) CONTROL DEVICE FOR CONTROLLING AN INTERNAL COMBUSTION ENGINE AND METHOD FOR HEATING AN EXHAUST EMISSION CONTROL DEVICE

(71) Applicant: Bayerische Motoren Werke Aktiengesellschaft, Munich (DE)

(72) Inventor: Nikita Peters, Munich (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 79 days.

(21) Appl. No.: 16/787,786

(22) Filed: Feb. 11, 2020

(65) Prior Publication Data
US 2020/0173388 A1 Jun. 4, 2020

Related U.S. Application Data

(63) Continuation of application No. PCT/EP2018/075270, filed on Sep. 19, 2018.

(30) Foreign Application Priority Data

Oct. 25, 2017 (DE) .................... 10 2017 219 172.4

(51) Int. Cl.
*F02D 41/06* (2006.01)
*F02D 13/02* (2006.01)
(Continued)

(52) U.S. Cl.
CPC ........... *F02D 41/062* (2013.01); *B60W 10/06* (2013.01); *B60W 10/08* (2013.01); *B60W 20/40* (2013.01);
(Continued)

(58) Field of Classification Search
CPC .............. F02D 41/062; F02D 41/0255; F02D 41/2441; F02D 41/32; F02D 13/0203;
(Continued)

(56) References Cited

U.S. PATENT DOCUMENTS

| 5,930,992 A | 8/1999 | Esch et al. |
| 2001/0005987 A1* | 7/2001 | Bolz ................... F01L 9/20 60/285 |

(Continued)

FOREIGN PATENT DOCUMENTS

| DE | 44 45 779 A1 | 6/1996 |
| DE | 197 20 381 A1 | 11/1998 |

(Continued)

OTHER PUBLICATIONS

International Search Report (PCT/ISA/210) issued in PCT Application No. PCT/EP2018/075270 dated Dec. 21, 2018 with English translation (six (6) pages).

(Continued)

*Primary Examiner* — George C Jin
(74) *Attorney, Agent, or Firm* — Crowell & Moring LLP

(57) ABSTRACT

An exhaust-gas purification system and method controls an internal combustion engine having at least one cylinder-piston unit operating in a overrun (drag) mode in which piston motion is induced by motion of an output shaft of a drive output unit associated with the internal combustion engine. A control device controls, for each of cylinder-piston unit, an intake fluid, an exhaust valve and fuel injection to heat an exhaust emission control device by deactivating fuel injection, passing the substantially fuel-free intake fluid into the cylinder, compressing and thereby heating the fluid in the cylinder, and passing the heated outlet fluid to the exhaust emission control device. The control device may control the amount of heating based on measurement and/or use of a temperature model of the exhaust emission control device.

11 Claims, 3 Drawing Sheets

(51) Int. Cl.
    *B60W 10/06*     (2006.01)
    *B60W 10/08*     (2006.01)
    *B60W 20/40*     (2016.01)
    *F02D 41/02*     (2006.01)
    *F02D 41/24*     (2006.01)
    *F02D 41/32*     (2006.01)

(52) U.S. Cl.
    CPC ..... *F02D 13/0203* (2013.01); *F02D 41/0255* (2013.01); *F02D 41/2441* (2013.01); *F02D 41/32* (2013.01); *F02D 2200/023* (2013.01); *F02D 2200/0414* (2013.01); *F02D 2200/0802* (2013.01); *F02D 2200/101* (2013.01); *F02D 2200/70* (2013.01)

(58) Field of Classification Search
    CPC ........... F02D 13/0215; F02D 2200/023; F02D 2200/0414; F02D 2200/0802; F02D 2200/101; F02D 2200/70; F02D 2009/0245; B60W 10/06; B60W 10/08; B60W 70/40
    See application file for complete search history.

(56) References Cited

U.S. PATENT DOCUMENTS

| | | |
|---|---|---|
| 2006/0010855 A1 | 1/2006 | Kemmner et al. |
| 2009/0107430 A1 | 4/2009 | Daigo |
| 2010/0146938 A1* | 6/2010 | Baum .................. B60W 20/15 60/285 |
| 2014/0041368 A1* | 2/2014 | Stavrianos ............ F02D 41/024 60/274 |
| 2015/0152793 A1* | 6/2015 | Matsuda ............. F02D 13/0215 60/285 |

FOREIGN PATENT DOCUMENTS

| | | |
|---|---|---|
| DE | 600 03 627 T2 | 6/2004 |
| DE | 103 48 107 A1 | 5/2005 |
| DE | 10 2005 006 702 A1 | 8/2006 |
| DE | 10 2008 063 449 A1 | 7/2010 |
| DE | 10 2015 224 003 A1 | 6/2017 |
| EP | 2 829 710 A1 | 1/2015 |
| WO | WO 2010/050857 | 5/2010 |
| WO | WO 2017/127219 A1 | 7/2017 |

OTHER PUBLICATIONS

German-language Written Opinion (PCT/ISA/237) issued in PCT Application No. PCT/EP2018/075270 dated Dec. 21, 2018 (six (6) pages).

German-language Search Report issued in counterpart German Application No. 10 2017 219 172.4 dated Apr. 4, 2018 with English translation (12 pages).

Cover page of EP 2 342 433 A1 published Jul. 13, 2011 (one (1) page).

* cited by examiner

CONTROL DEVICE FOR CONTROLLING AN INTERNAL COMBUSTION ENGINE AND METHOD FOR HEATING AN EXHAUST EMISSION CONTROL DEVICE

CROSS REFERENCE TO RELATED APPLICATIONS

This application is a continuation of PCT International Application No. PCT/EP2018/075270, filed Sep. 19, 2018, which claims priority under 35 U.S.C. § 119 from German Patent Application No. 10 2017 219 172, filed Oct. 25, 2017, the entire disclosures of which are herein expressly incorporated by reference.

BACKGROUND AND SUMMARY OF THE INVENTION

The present invention relates to a control device for controlling an internal combustion engine in an overrun mode, in order to keep an exhaust-gas purification device, arranged downstream of the internal combustion engine, at an operating temperature, or to bring said exhaust-gas purification device to said operating temperature, and to a method for heating an exhaust-gas purification device.

In order to satisfy the emission requirements for modern internal combustion engines, an exhaust-gas purification system is conventionally arranged downstream of an internal combustion engine and removes pollutants, for example NOX or soot, from the exhaust gas discharged by the internal combustion engine. Said exhaust-gas purification device has to have a minimum temperature for a functionally correct operation. During a normal operation of the internal combustion engine, said temperature is in principle provided, but if the internal combustion engine is kept in an overrun state for an extensive period of time, for example with extensive downhill driving or, in the case of a hybrid drive, with the use of an electric machine, the temperature of the exhaust-gas purification device can be reduced to such an extent, or be so low, that exhaust-gas purification is not possible. DE 19720381, for example, has therefore proposed that, during operation of an emission-free drive assembly, such as for example an electric machine, and prior to start-up of the internal combustion engine, the exhaust-gas purification device is brought to the required operating temperature by means of an additional heating element.

However, the disadvantage of this external and additional heating element is that it is necessary to apply additional electrical energy for the heating element and it is necessary to provide an installation space for the heating element.

It is therefore an object of the present invention to provide a possibility for keeping at, or for bringing to, an operating temperature an exhaust-gas purification device without provision having to be made of an additional heating system and without polluting the environment through excessive emissions of the exhaust gas.

Proposed below is a control device for controlling an internal combustion engine, having at least one cylinder-piston unit, in an overrun mode, which control device serves for bringing to an operating temperature, or for keeping at said operating temperature, an exhaust-gas purification device assigned to the internal combustion engine.

Here, by definition, in an overrun mode, a piston movement of the cylinder-piston unit is induced via a movement of a drive output unit assigned to the internal combustion engine, in particular a drive output shaft. Such an overrun mode can arise for example due to particular driving states, such as for example downhill driving or the removal of the foot from the gas pedal. Then, the piston is moved purely by the rotational movement transmitted from the wheels to the drive output shaft, if the internal combustion engine is coupled to the drive output shaft. Such an overrun mode can likewise be achieved if, for example in the case of purely electric driving, in which an electric machine transmits a torque to the wheels of the vehicle, the internal combustion engine is not decoupled from the electric machine by means of a clutch device, but rather remains coupled, with the result that the torque of the electric machine is transmitted not only to the wheels but also to the internal combustion engine. Here too, the movement of the piston is induced via the rotational movement of the drive output shaft.

Furthermore, each cylinder-piston unit of the internal combustion engine has an inlet valve in order to deliver an inlet fluid into the cylinder. According to the configuration of the engine, said inlet fluid may be pure air or an air-fuel mixture. The cylinder-piston unit furthermore has an outlet valve which transfers an outlet fluid into the exhaust-gas purification device. For a normal operation of the internal combustion engine, said outlet fluid is the exhaust gas, that is to say the combustion gases after the fuel combustion in the cylinder-piston unit has taken place. As mentioned above, by means of a fuel injection apparatus, fuel may be introduced directly into the inlet fluid upstream or downstream of the inlet valve. The control of the inlet valve and outlet valve and the fuel injection into the inlet fluid is controlled via the control device.

In order to make possible heating of the exhaust-gas purification device or maintenance of the exhaust-gas purification device at its operating temperature, it is proposed according to the invention that, in the overrun mode, the control device causes the means for fuel injection into the inlet fluid to be deactivated and activates the inlet and outlet valves such that the then substantially fuel-free inlet fluid, in other words the sucked-in air, is introduced into the cylinder, is compressed by the movement of the piston induced in the overrun mode, is heated by the compression, and, after the compression, is transferred as heated outlet fluid into the exhaust-gas purification device through the outlet valve.

As is known from the technology for diesel engines, the compression realized in the cylinder can result in the air being heated to several hundred degrees, and so an outlet fluid heated in this manner is perfectly capable of heating the exhaust-gas purification device arranged downstream to its operating temperature, or keeping said exhaust-gas purification device at its operating temperature.

The exhaust-gas purification device may for example be a three-way catalytic converter, a particle filter, a particle filter with a catalytic coating, a NOx storage catalytic converter, an SCR catalytic converter, an oxidation catalytic converter or a combination thereof. It goes without saying that exhaust-gas purification devices other than/in addition to the stated exhaust-gas purification devices may be present.

Here, this control device may be used firstly with pure internal combustion engines in the case of long downhill driving. However, what is particularly advantageous is the use with hybrid drives, in the case of which an emission-free drive, such as for example an electric machine, provides for the overrun mode of the vehicle. With such hybrid drives, there is always the problem that, prior to a connection of the internal combustion engine, the exhaust-gas purification device has to be brought to operating temperature so as to avoid an excessive emission of pollutants.

In order to determine whether a connection of the internal combustion engine in the hybrid drive will occur shortly, use may be made of a prediction model which is stored for example in a memory unit associated with the control device. Here, said prediction model predicts a connection of the internal combustion engine based for example on a driving profile, GPS data and/or traffic information data.

According to a further advantageous embodiment, the control device is furthermore designed to activate the outlet valve such that the outlet valve is opened when the piston is in a region of the top dead center. The fluid present in the cylinder, more precisely in the cylinder interior space, has its greatest compression, and thus its highest heating, in the region of the top dead center and, when it is discharged, can heat the exhaust-gas purification device effectively.

Here, however, the outlet valve may be opened in a position other than in the region of the top dead center. Although this can reduce the attainable temperature of the fluid in the cylinder, the attainable temperature is then also so high that heating of the exhaust-gas purification device is possible. Reasons for opening the outlet valve at other positions may be provided for example by hardware limitations.

It is furthermore advantageous for the control device to activate the outlet valve such that the outlet valve is opened when the heated outlet fluid has a desired or required temperature. It is thus possible for example for the outlet valve to be opened already prior to a maximum compression, it also however being possible to let the piston pass through multiple strokes until the fluid present in the cylinder has the corresponding temperature.

According to a further advantageous exemplary embodiment, it is also possible for use to be made of an exhaust-gas recirculation (EGR) system, in order to return already heated outlet fluid into an intake manifold of the internal combustion engine. Since already heated fluid is then introduced into the cylinder interior space, the temperature can once again be significantly increased. As an alternative or in addition to using an exhaust-gas recirculation system, it is also possible for the outlet valve to be activated such that, instead of, via activation of the inlet valve, fresh cold inlet fluid being introduced into the cylinder interior space, the outlet valve is opened during the intake, with the result that the heated outlet fluid is sucked back into the cylinder interior space and, there, can be heated further.

In order to determine the temperature of the heated outlet fluid, provision may be made in the cylinder of a measurement sensor which determines the temperature of the fluid.

Alternatively, however, it is also possible to merely estimate the temperature of the heated outlet fluid. For this purpose, it is possible, for example at an engine test stand, to measure, and to store in a temperature model, the change in temperature of the fluid present in the cylinder interior space during compression for several different scenarios. Said temperature model can then be stored in a memory device which interacts with the control device and be read out from said memory device, such that the control device opens the outlet valve whenever the temperature model defines that the heated fluid in the cylinder has a particular or desired temperature. Here, it is possible for a multiplicity of operating parameters of the internal combustion engine or of the drive system to be generally stored in the temperature model. In particular, the temperature model can furthermore determine a change in temperature based on the rotational speeds of the internal combustion engine, the temperatures of the inlet fluid, the ambient outside temperatures and/or the number of piston strokes. All of these parameters influence the temperature of the outlet fluid that is required for heating the exhaust-gas purification device, the heating rate which is attained with an outlet fluid at a particular temperature, and/or the temperature of the outlet fluid at a particular time. It goes without saying that, in addition to the stated parameters, consideration may be made of yet further parameters which have an influence on the temperature model.

According to a further advantageous embodiment, the control device is furthermore designed such that it allows reactivation of the means for fuel injection, and a transition of the valve activation into normal operation, only when the exhaust-gas purification device has attained a particular minimum temperature, in particular the operating temperature thereof. This ensures that "normal" internal combustion engine operation or a connection of the internal combustion engine is realized only when effective exhaust-gas purification is ensured. The attainment of the operating temperature may likewise be measured by a measurement sensor.

Alternatively or additionally, however, it is also possible for the attainment of the corresponding operating temperature of the exhaust-gas purification device to be estimated, in that the temperature profiles are determined at a test stand for a wide variety of operating parameters and stored in the temperature model. This makes it possible for the temperature model also to define when and under what conditions the exhaust-gas purification device attains its operating temperature.

Furthermore, account can be taken of aging-induced increases in operating temperature of the exhaust-gas purification device by both the measurement sensors and the temperature model. This is advantageous in particular since, in a manner dependent on the mileage or generally an aging state of the exhaust-gas purification device, the minimum operating temperature of the latter is increased over the course of time.

The use of the temperature model has the advantage that provision does not have to be made in the cylinder or the exhaust-gas purification device of additional units, such as for example temperature measurement sensors, which interact with the control device.

Since the temperature model maps the temperature profiles of the fluid in the cylinder or of the heated outlet fluid and/or of the exhaust-gas purification device for a wide variety of operating states, it is generally possible for highly reliable statements concerning an attained temperature state of both the fluid and the exhaust-gas purification device to be made.

It is likewise advantageous if the control device does not automatically activate, according to the above description, the means for fuel injection or the valves for each detected overrun mode, but rather checks beforehand whether heating of the exhaust-gas purification device is necessary at all. Such heating may be necessary for example if, by means of the aforementioned prediction model, a connection of the internal combustion engine is pending and/or if the temperature of the exhaust-gas purification device is below the operating temperature. Whether the latter is case can be determined via direct measurement using the measurement sensor or via the aforementioned temperature model.

According to a further advantageous embodiment, it goes without saying that, as before, an additional heating element, such as for example a heatable plate, an electrical catalytic converter or the like, may be present upstream of the exhaust-gas purification device.

A further aspect of the present invention relates to a hybrid drive system of a hybrid vehicle, having an electric machine and having an internal combustion engine, wherein the internal combustion engine is activated as described above by a control device.

A further aspect of the present invention relates to a method for activating an internal combustion engine, in particular an internal combustion engine in a hybrid drivetrain of a hybrid vehicle as described above, wherein the method has the steps:

overrunning the internal combustion engine for a movement of the piston induced by the electric machine and/or by a driving state;
deactivating a means for fuel injection in the inlet fluid;
introducing a substantially fuel-free inlet fluid into the cylinder;
compressing and thus heating the fluid in the cylinder by way of the induced movement of the piston, and thus providing a heated outlet fluid;
discharging the heated outlet fluid into the exhaust-gas purification device; and
heating the exhaust-gas purification device by means of the heated outlet fluid.

Here, it is advantageous in particular if, prior to the method being carried out, by means of the temperature model or an internal combustion engine start prediction model, a check is made as to whether heating of the exhaust-gas purification device is necessary.

It is furthermore preferable if the method has one of the following steps:
providing, by way of measurement at an engine test stand, a temperature model for the heating of the fluid present in the cylinder in the overrun mode;
storing the temperature model in a memory apparatus in the vehicle;
reading out the temperature model from the memory apparatus;
opening the outlet valve, and discharging the heated outlet fluid, when the temperature model defines that the fluid in the cylinder has a particular temperature.

Additionally, the method may advantageously have the one of the following steps:
providing in the temperature model, by way of measurement at the engine test stand, a temperature change profile of the exhaust-gas purification device, which is based on at least the temperature of the heated outlet fluid;
reactivating the means for fuel injection, and activating the inlet and outlet valves according to a normal operation for the internal combustion engine, when the temperature model defines that the exhaust-gas purification device has attained an operating temperature.

The embodiments and features described for the proposed control device accordingly apply to the proposed method.

Also proposed is a computer program product having program code which is configured to initiate the carrying-out of the aforementioned method on a processor of the control unit.

A computer program product, such as for example a computer program medium, may be provided or supplied as a storage medium, such as for example a memory card, USB stick, CD-ROM, DVD or else in the form of a downloadable file from a server in a network. This may be realized for example in a wireless communication network by the transmission of a corresponding file with the computer program product or the computer program medium.

Further possible implementations of the invention also comprise not explicitly stated combinations of features or embodiments that are described above or below and with respect to the example embodiments. Here, a person skilled in the art will also add individual aspects as improvements or additions to the respective basic form of the invention.

Further advantages and advantageous embodiments are specified in the description, the drawings and the claims. Here, the combinations of the features that are specified in the description and in the drawings are in particular purely examples, and so the features may also be provided individually or so as to be differently combined.

Other objects, advantages and novel features of the present invention will become apparent from the following detailed description of one or more preferred embodiments when considered in conjunction with the accompanying drawings.

BRIEF DESCRIPTION OF THE DRAWINGS

Below, identical elements or elements of functionally identical action are denoted by the same reference signs.

DETAILED DESCRIPTION OF THE DRAWINGS

Figure 1:
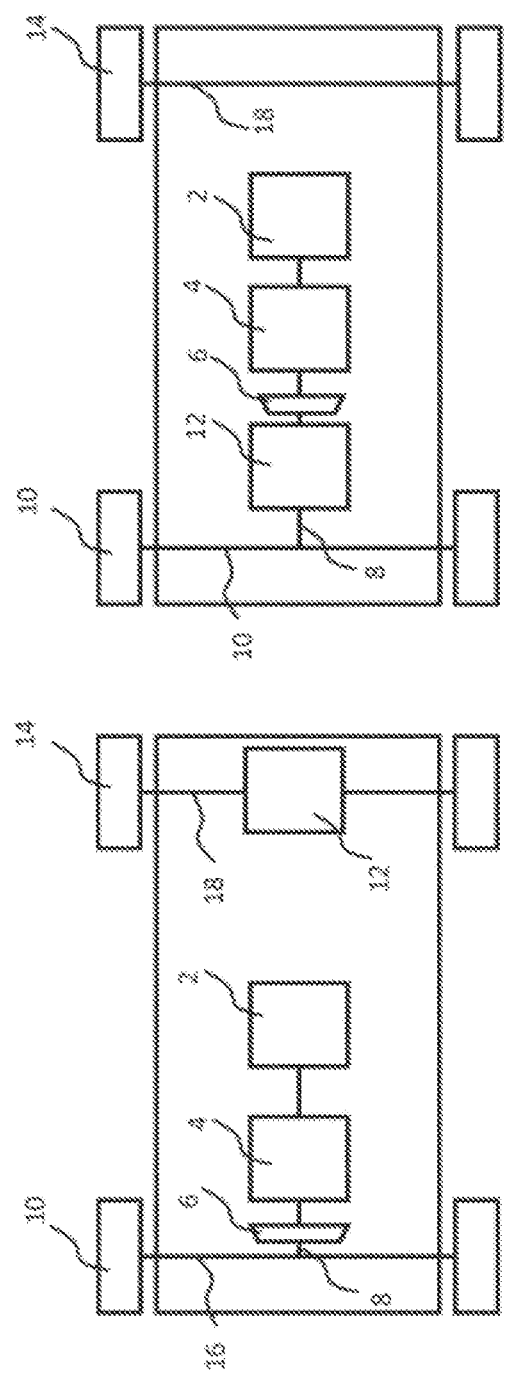
FIGS. 1A and 1B show schematic illustrations of two possible hybrid drive systems in accordance with the present invention.

FIG. 1 shows two different configurations of a hybrid drive system 1, wherein, in FIG. 1A, an internal combustion engine 2 is connected via a transmission 4 and a clutch device 6 to a drive output unit 8, in particular vehicle wheels 10, while an electric machine 12 is connected to another pair of vehicle wheels 14. This means that the vehicle constructed in this manner is driven by the internal combustion engine 2 at one wheel axle 16, while it is driven by an electric machine 12 at the other wheel axle 18. Here, the electric machine 12 and the internal combustion engine 2 can jointly provide for a drive of the vehicle 1, it also however being possible for only the electric machine 12 or the internal combustion engine 2 to drive the vehicle.

FIG. 1B shows an alternative configuration of a vehicle having a hybrid drive, in which only one vehicle axle 16 is driven, while the other vehicle axle 18 merely co-rotates. In this case, the internal combustion engine 2 and the electric motor 12 are able to be connected to one another, or disconnected from one another, via the clutch unit 6. Also in this case, it is thereby possible for a combined operation of the internal combustion engine 2 and the electric motor 12, or a disconnected operation of only the electric motor 12 or only the internal combustion engine 2, to be provided. It goes without saying that other configurations are also possible.

Figure 2:
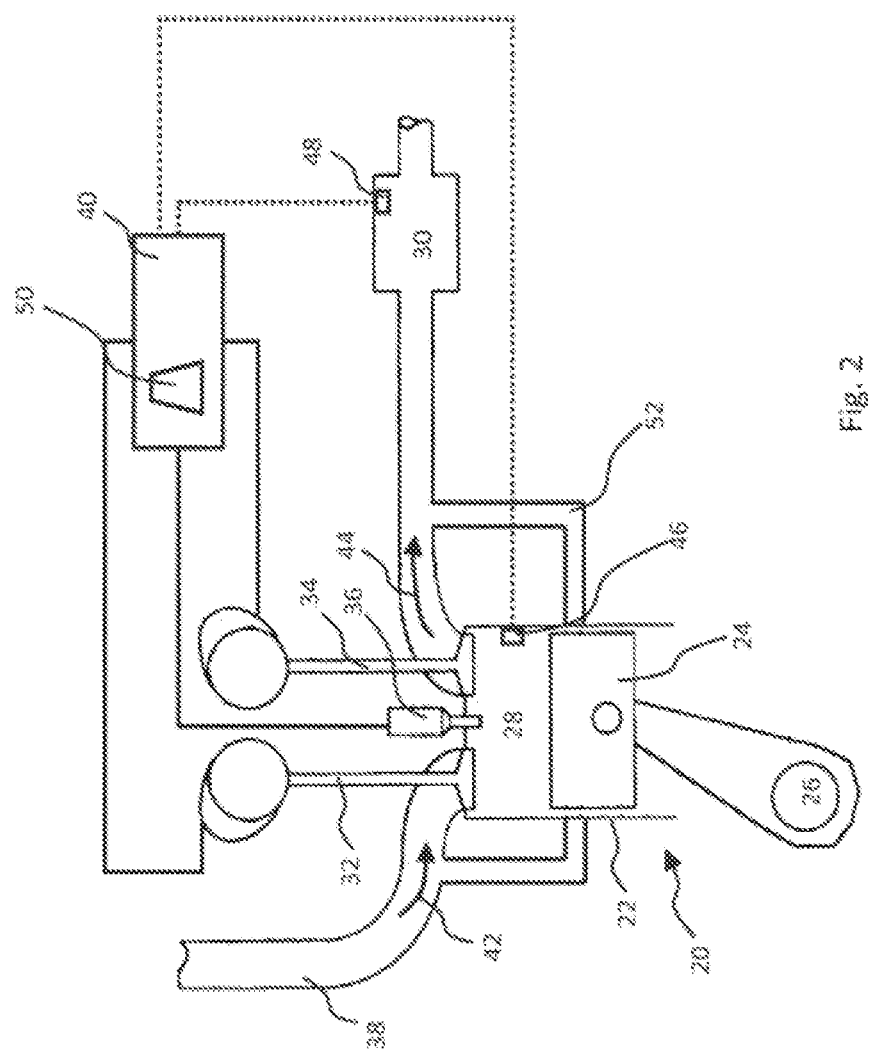
FIG. 2 shows a schematic illustration of an internal combustion engine with an exhaust-gas purification device in accordance with the present invention.

As is conventional, the internal combustion engine 2 has multiple cylinder-piston units 20, of which one is schematically shown in FIG. 2. The cylinder-piston unit 20 or the internal combustion engine 2 is furthermore, as FIG. 2 shows, connected to an exhaust-gas purification device 30. Such an exhaust-gas purification device, also referred to as a catalytic converter, purifies the exhaust gases of the internal combustion engine 2 of pollutants, such as for example nitrogen oxides or soot. For an effective exhaust-gas purification, however, the exhaust-gas purification device 30 must have a particular operating temperature. This can, moreover, change with increasing age of the exhaust-gas purification device 30.

In the case of an overrun mode of the internal combustion engine 2, for example during downhill driving or for a purely electrical drive, a situation may however arise in which the operating temperature of the exhaust-gas purification device 30 can no longer be maintained. Likewise, in the case of hybrid drives, as shown in FIG. 1, it may be the case that, if the internal combustion engine 2 is to be connected to the electric motor 12 after purely electric driving, the temperature of the exhaust-gas purification device 30 is not at operating temperature, and so, in both cases, effective exhaust-gas purification cannot be carried out.

As mentioned, FIG. 2 schematically shows a cylinder-piston unit 20 of an internal combustion engine 2, wherein the cylinder-piston unit 20 has a cylinder 22 and piston 24 which is movable therein, wherein the piston 24 is in turn connected to a drive output unit 8, in particular a transmission input shaft 26, in order to transmit a torque to the wheels 10. The cylinder-piston unit 20 furthermore has an inlet valve 32, an outlet valve 34 and a fuel injection apparatus 36, which, broadly in principle, interact with one another such that air is introduced via the inlet valve 32 from an intake manifold 38 into the cylinder interior space 28, has fuel added to it there by the fuel injection apparatus 36 and is then ignited, and the exhaust gas forming during the combustion is transferred via the outlet valve 36 to the exhaust-gas purification device 30. With this normal operation, the movement of the piston 24 is induced via the combustion taking place in the interior space 28 of the cylinder-piston unit 20 and the accompanying expansion and pressure movement of the piston 24 downward. During the aforementioned overrun mode, however, the movement of the piston 24 is induced via, for example, the rotational movement of the wheels 10 or via the torque transmission of the electric machine 12.

Here, the inventor has recognized that this induced movement of the piston 24 may be used to compress a fluid in the cylinder space 28, and in this way to heat said fluid, and to deliver the heated fluid to the exhaust-gas purification device 30 in order to heat the latter.

In order to make possible such heating of the exhaust-gas purification device 30, a control device 40 which activates both the inlet valve 32 and the outlet valve 34 and the fuel injection apparatus 36 is furthermore proposed. The inlet valve 32, the outlet valve 34 and the fuel injection apparatus 36 are conventional elements of the internal combustion engine 2 and, as mentioned above, are conventionally activated by the control device 40 such that the inlet fluid 42 (for example air) is introduced via the inlet valve 32 into the working space 28 of the cylinder-piston unit 20. In this case, the inlet fluid 42 may be an air-fuel mixture, wherein then the fuel injection apparatus 36 is arranged upstream of the valve 34, or, as in the case illustrated in FIG. 2, pure sucked-in air which is introduced into the interior space 28 of the cylinder-piston unit 20 and has fuel added to it there. After ignition of the air-fuel mixture has taken place in the piston cylinder interior space 28, the exhaust gas 44 which thus forms is transferred via the outlet valve 34 into the exhaust-gas purification system 30.

If the exhaust-gas purification system 30 is then to be heated, however, for example because the temperature $T_{cat}$ of the exhaust-gas purification device 30 is below its operating temperature $T_{cat,targ}$ or because a start-up of the internal combustion engine 2 is likely, the control unit 40 controls the inlet valve 32, the outlet valve 34 and the fuel injection apparatus 36 such that the fuel injection is deactivated, and a substantially fuel-free inlet fluid 42 is introduced via the inlet valve 32 into the interior space 28 of the cylinder-piston unit 20. There, said fluid is compressed by the movement of the piston 24 induced by the overrun mode and is heated during this compression, with the result that the resulting heated fluid is transferred as heated outlet fluid 44 into the exhaust-gas purification device 30 through the outlet valve 34. Since, during said compression, temperatures of several hundred degrees Celsius can be easily attained, heating of the exhaust-gas purification device 30 is possible without any problems. Here, it is in particular preferable if the outlet valve 34 is activated by the control device 40 such that it is opened when the piston 24 is in a region of the top dead center, that is to say the fluid is in a state of high compression.

Alternatively or additionally, the control device 40 can control the outlet valve 34 such that the outlet valve 34 is opened when the fluid in the cylinder interior space 28 has attained a particular temperature $T_F$. Said temperature $T_F$ may be determined for example via a temperature sensor 46 arranged in the cylinder interior space.

Furthermore, the control device 40 may be designed to allow an injection of fuel and a normal operation of the inlet and outlet valves 32, 34 only when a temperature of the exhaust-gas purification system $T_{cat}$ has attained a particular value. This temperature may also be measured for example via a temperature sensor 48 present in the exhaust-gas purification device 30, and be made available to the control device 40.

Instead of the direct measurement of the temperatures in the cylinder interior space 28 or in the exhaust-gas purification system 30, it is also possible for the control device 40 to be assigned a memory module 50, for example integrated in the control device 40, in which memory module a temperature model of the fluid temperature $T_F$, and/or of the exhaust-gas purification device temperature $T_{cat}$, is stored. Here, the temperature model can be determined for example via measurements at an engine test stand, with which the temperature profiles of the temperatures $T_F$ and $T_{cat}$ are measured for different operating parameters and engine settings. Here, the temperature model may for example be a multi-dimensional matrix which contains for example information about the temperature of the inlet fluid, the temperature of the surroundings, the rotational speed of the overrun engine, the volumetric flow rate of the outlet fluid, the temperature of the outlet fluid and the temperature of the exhaust-gas purification system. It goes without saying that further information about relevant operating parameters may be contained in the matrix. In the control unit 50, it is furthermore also possible to store a prediction model which, for example on the basis of GPS data and/or traffic information, predicts a connection of the internal combustion engine and thus the requirement for an exhaust-gas purification device at operating temperature.

On the basis of said multi-dimensional parameters, the control device 40 can establish for example when, at a given temperature of the inlet fluid $T_{eF}$, at a given temperature of the outlet fluid $T_F$, at a given volumetric flow rate of the outlet fluid $V_F$ and/or at a given engine rotational speed n, an operating temperature $T_{cat,targ}$ of the exhaust-gas purification device is attained.

Figure 3:
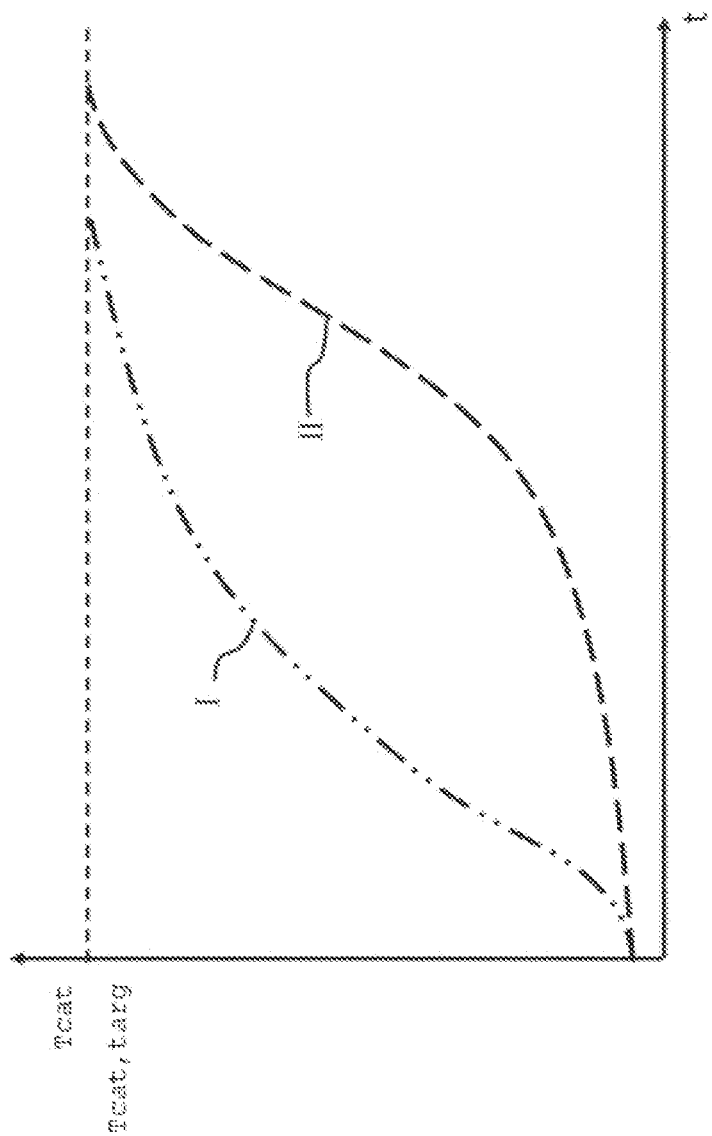
FIG. 3 shows a schematic illustration of a temperature model in accordance with the present invention.

Schematically, such a relationship can be illustrated for example via a diagram, as shown in FIG. 3. The diagram shown in FIG. 3 is a time-temperature diagram, with the temperature of the catalytic converter $T_{cat}$ being plotted over time t. By way of example, FIG. 3 indicates two temperature profiles I, II which are obtained for example for different starting parameters. It can be seen here that, with the temperature profile I, the exhaust-gas purification device 30 is at its operating temperature $T_{cat,targ}$ quicker than in the case in which the parameters of the graph II are used.

Here, the increase in temperature of the catalytic converter $T_{cat}$ in principle significantly dependent on the temperature of the outlet fluid $T_F$. The temperature of said outlet fluid $T_F$ may be in turn influenced for example via the strength of the compression or the temperature of the inlet fluid. Here, it is also possible for use to be made of an exhaust-gas recirculation system 52 (see FIG. 2) to use already compressed and heated air as an inlet fluid such that the heated air is compressed once again and the temperature thereof thus further increased. Another important parameter for increasing the temperature of the catalytic converter is the frequency at which the catalytic converter is provided with the heated air. This may be regulated for example via the rotational speed of the engine. Instead of using an exhaust-gas recirculation system for the recirculation of compressed heated air, the air may also be kept in the cylinder interior space for multiple piston strokes.

Overall, it is possible by way of the proposed control device or the proposed method for an exhaust-gas purification device to be kept at an operating temperature, or to be brought to the operating temperature, during an overrun mode of the internal combustion engine without provision having to be made of an additional heating device. This makes it possible for cost-saving and energy-saving heating of the exhaust-gas purification device to be provided.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

REFERENCE SIGNS

1 Hybrid drive system
2 Internal combustion engine
4 Transmission
6 Clutch device
8 Drive output unit
10, 14 Wheels
12 Electric machine
16, 18 Vehicle axles
20 Cylinder-piston unit
22 Cylinder
24 Piston
26 Transmission input shaft
28 Cylinder interior space
30 Exhaust-gas purification device
32 Inlet valve
34 Outlet valve
36 Means for fuel injection
38 Intake manifold
40 Control device
42 Inlet fluid
44 Outlet fluid
46, 48 Temperature sensors
50 Memory apparatus
52 Exhaust-gas recirculation system
$T_{cat}$ Temperature of the exhaust-gas purification device
$T_{cat,targ}$ Operating temperature of the exhaust-gas purification device
$T_F$ Temperature of the fluid in the cylinder interior space

What is claimed is:

1. A control device for controlling an internal combustion engine having at least one cylinder-piston unit configured such that in an overrun mode a movement of a piston in a cylinder of the cylinder-piston unit is induced via movement of a drive output shaft of a drive output unit assigned to the internal combustion engine, the at least one cylinder-piston unit in each case having an inlet valve configured to control delivery of an inlet fluid into a cylinder interior space and an outlet valve configured to control transfer of an outlet fluid from the cylinder interior space to an exhaust-gas purification device fluidically connected to the cylinder,
wherein
the control device is configured to control the inlet valve and the outlet valve of the at least one cylinder, and control fuel injection into the inlet fluid,
in the overrun mode, the control device is configured to deactivate the fuel injection and activate the inlet valve such that the inlet fluid which is substantially fuel-free is introduced into the cylinder interior space and compressed and heated by the movement of the piston, and to activate the outlet valve such that outlet fluid heated by the compression is transferred to the exhaust-gas purification device to heat the exhaust-gas purification device,
the control device is configured to interact with a memory apparatus, the memory apparatus containing a temperature model of the fluid in the cylinder interior space in the overrun mode,
the control device is configured to open the outlet valve when the temperature model of the fluid determines that the fluid in the cylinder interior space has a predetermined temperature,
the memory includes a prediction model of a start-up of the internal combustion engine, and
the control device is configured to deactivate fuel injection into the inlet fluid and to activate the inlet and outlet valves for heating of the exhaust-gas purification device only when there is a condition of one or both of
a temperature of the exhaust-gas purification device is below a target operating temperature as determined from one or both of a temperature measurement sensor and the temperature model, and
a prediction generated by the prediction model that a start-up of the internal combustion engine is required.

2. The control device according to claim 1, wherein the internal combustion engine is part of a hybrid drive with an electric machine, and
in the overrun mode, the piston movement is induced by one or both of a torque transferred to the drive output shaft from the electric machine and a movement of the drive output shaft due in a driving state.

3. The control device according to claim 1, wherein the control device is configured to activate the outlet valve such that the outlet valve is opened when the piston is in a region of top dead center.

4. The control device according to claim 1, wherein the control device is configured to activate the outlet valve such that the outlet valve is opened when the fluid in the cylinder interior space has a predetermined temperature.

5. The control device according to claim 1, wherein the temperature model includes data of one or more of a rotational speed of the overrun internal combustion engine, a temperature of the inlet fluid, an ambient outside temperature and a temperature of the exhaust-gas purification device.

6. The control device according to claim 1, wherein the predicted start-up of the internal combustion engine is associated with a prediction of a need to connect the internal combustion engine to the drive output unit.

7. The control device according to claim 1, wherein the control device is configured to reactivate fuel injection and activate the inlet and outlet valves according to a normal operation for the internal combustion engine only when the exhaust-gas purification device has attained a target operating temperature.

8. The control device according to claim 7, wherein the temperature model determines when the target operating temperature of the exhaust-gas purification device is attained.

9. A hybrid drive system of a hybrid vehicle, having an electric machine and an internal combustion engine, the hybrid vehicle being configured to transmit a torque from one or both of the electric machine and the internal combustion engine to a drive output unit, wherein
the hybrid drive system includes the control device of claim 1.

10. A method for activating an internal combustion engine, comprising the act of:
controlling the internal combustion engine using the control device according to claim 1.

11. A method for increasing a temperature (Tcat) of an exhaust-gas purification device which is fluidically connected to an internal combustion engine in a hybrid drive system of a hybrid vehicle, the internal combustion engine having at least one cylinder-piston unit a cylinder, a piston movable in the cylinder, an inlet valve configured to control delivery of an inlet fluid into a cylinder interior space and an outlet valve configured to transfer an outlet fluid from the cylinder interior space to an exhaust-gas purification device which is fluidically connected to the cylinder, comprising the acts of:
overrunning the internal combustion engine such that a movement of the piston is induced by one or both of the electric machine or a drive output shaft in a driving state;
deactivating fuel injection into the inlet fluid;
introducing the inlet fluid that is substantially fuel-free into the cylinder interior space;
compressing and heating the fluid present in the cylinder interior space by the induced movement of the piston to generate a heated outlet fluid;
discharging the heated outlet fluid into the exhaust-gas purification device;
heating the exhaust-gas purification device with the heated outlet fluid;
determining providing, a temperature model for the heating of the fluid present in the cylinder interior space by measurement at an engine test stand;
storing the temperature model in a memory apparatus assigned to the internal combustion engine;
reading out the temperature model from the memory apparatus;
opening the outlet valve and discharging the heated outlet fluid when the temperature model determines that the fluid in the cylinder interior space is below a predetermined temperature;
providing in the temperature model a temperature change profile of the exhaust-gas purification device which is based on at least the temperature of the heated outlet fluid; and
reactivating fuel injection and activating the inlet and outlet valves according to a normal operation for the internal combustion engine when the temperature model determines that the exhaust-gas purification device has attained a target operating temperature.

\* \* \* \* \*